(12) United States Patent
Porter et al.

(10) Patent No.: US 7,490,123 B2
(45) Date of Patent: Feb. 10, 2009

(54) DATA COMPRESSION (75) Inventors: Robert Mark Stefan Porter, Winchester (GB); Nicholas Ian Saunders, Basingstoke (GB); James Edward Burns, Basingstoke (GB); Jonathan Living, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 1354 days.

(21) Appl. No.: 10/400,428

(22) Filed: Mar. 27, 2003

(65) Prior Publication Data

US 2003/0188025 A1   Oct. 2, 2003

(30) Foreign Application Priority Data

Mar. 28, 2002   (GB)   .................. 0207423.5

(51) Int. Cl.
 *G06F 15/13* (2006.01)
(52) U.S. Cl. ............. 709/203; 375/240.12; 375/240.16; 382/234
(58) Field of Classification Search ................. 709/203; 375/240.12, 240.16; 382/239
See application file for complete search history.

(56) References Cited

U.S. PATENT DOCUMENTS

| | | | | |
|---|---|---|---|---|
| 6,385,241 | B1 * | 5/2002 | Saw | 375/240.03 |
| 6,640,012 | B1 * | 10/2003 | Shnaider et al. | 382/239 |
| 2002/0054644 | A1 * | 5/2002 | Henry et al. | 375/240.27 |
| 2003/0002583 | A1 * | 1/2003 | Geerlings | 375/240.12 |
| 2003/0048208 | A1 * | 3/2003 | Karczewicz | 341/67 |
| 2003/0161401 | A1 * | 8/2003 | Shen et al. | 375/240.16 |

FOREIGN PATENT DOCUMENTS

| | | |
|---|---|---|
| EP | 0 509 576 | 10/1992 |
| EP | 1 103 919 | 5/2001 |

* cited by examiner

*Primary Examiner*—Jinsong Hu
(74) *Attorney, Agent, or Firm*—Oblon, Spivak, McClelland, Maier & Neustadt, P.C.

(57) ABSTRACT

A data compression apparatus for performing data compression on input data comprises a quantisation parameter estimation arrangement for deriving an estimated value of a quantisation parameter used in a previous compression/decompression cycle applied to the input data, by detecting rounding effects in data values of at least a subset of the input data; and a parameter selection arrangement, responsive to the quantisation parameter estimation arrangement for selecting a quantisation parameter for use in compression of the input data.

10 Claims, 9 Drawing Sheets

| Q_SCALE_CODE | Q_SCALE | |
|---|---|---|
| | Q_SCALE_TYPE=0 (Linear Quantiser) | Q_SCALE_TYPE=1 (Non-Linear Quantiser) |
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |
| 8 | 16 | 8 |
| 9 | 18 | 10 |
| 10 | 20 | 12 |
| 11 | 22 | 14 |
| 12 | 24 | 16 |
| 13 | 26 | 18 |
| 14 | 28 | 20 |
| 15 | 30 | 22 |
| 16 | 32 | 24 |
| 17 | 34 | 28 |
| 18 | 36 | 32 |
| 19 | 38 | 36 |
| 20 | 40 | 40 |
| 21 | 42 | 44 |
| 22 | 44 | 48 |
| 23 | 46 | 52 |
| 24 | 48 | 56 |
| 25 | 50 | 64 |
| 26 | 52 | 72 |
| 27 | 54 | 80 |
| 28 | 56 | 88 |
| 29 | 58 | 96 |
| 30 | 60 | 104 |
| 31 | 62 | 112 |

DATA COMPRESSION

BACKGROUND OF THE INVENTION

1. Field of the Invention

The present invention relates to data compression.

2. Description of the Prior Art

Data compression techniques are used extensively in the data communications field in order to communicate data at bit rates that can be supported by communication channels having dynamically changing but limited bandwidths. Image data is typically compressed prior to either transmission or storage on an appropriate storage medium and it is decompressed prior to image reproduction.

In the case of still images data compression techniques take advantage of spatial redundancy, whilst for moving images both spatial and temporal redundancy is exploited. Temporal redundancy arises in moving images where successive images in a temporal sequence, particularly images belonging to the same scene, can be very similar. The Motion Picture Experts Group (MPEG) has defined international standards for video compression encoding for entertainment and broadcast applications. The present invention is relevant (though not at all restricted) to implementations of the MPEG4 "Studio Profile" standard that is directed to high end video hardware operating at very high data rates (up to 1 Gbit/s) using low compression ratios.

Discrete Cosine Transform (DCT) Quantisation is a widely used encoding technique for video data. It is used in image compression to reduce the length of the data words required to represent input image data prior to transmission or storage of that data. In the DCT quantisation process the image is segmented into regularly sized blocks of pixel values and typically each block comprises 8 horizontal pixels by 8 vertical pixels ($8_H \times 8_V$). In conventional data formats video data typically has three components that correspond to either the red, green and blue (RGB) components of a colour image or to a luminance component Y along with two colour difference components Cb and Cr. A group of pixel blocks corresponding to all three RGB or YCbCr signal components is known as a macroblock (MB).

The DCT represents a transformation of an image from a spatial domain to a spatial frequency domain and effectively converts a block of pixel values into a block of transform coefficients of the same dimensions. The DCT coefficients represent spatial frequency components of the image block. Each coefficient can be thought of as a weight to be applied to an appropriate basis function and a weighted sum of basis functions provides a complete representation of the input image. Each $8_H \times 8_V$ block of DCT coefficients has a single "DC" coefficient representing zero spatial frequency and 63 "AC" coefficients. The DCT coefficients of largest magnitude are typically those corresponding to the low spatial frequencies. Performing a DCT on an image does not necessarily result in compression but simply transforms the image data from the spatial domain to the spatial frequency domain. In order to achieve compression each DCT coefficient is divided by a positive integer known as the quantisation divisor and the quotient is rounded up or down to the nearest integer. Larger quantisation divisors result in higher compression of data at the expense of harsher quantisation. Harsher quantisation results in greater degradation in the quality of the reproduced image. Quantisation artefacts arise in the reproduced images as a consequence of the rounding up or down of the DCT coefficients. During compressed image reproduction each DCT coefficient is reconstructed by multiplying the quantised coefficient (rounded to the nearest integer), rather than the original quotient, by the quantisation step which means that the original precision of the DCT coefficient is not restored. Thus quantisation is a "lossy" encoding technique.

Image data compression systems typically use a series of trial compressions to determine the most appropriate quantisation divisor to achieve a predetermined output bit rate. Trial quantisations are carried out at, say, twenty possible quantisation divisors spread across the full available range of possible quantisation divisors. The two trial adjacent trial quantisation divisors that give projected output bit rates just above and just below the target bit rate are identified and a refined search is carried out between these two values. Typically the quantisation divisor selected for performing the image compression will be the one that gives the least harsh quantisation yet allows the target bit rate to be achieved.

Although selecting the least harsh quantisation will result in the best possible image quality (i.e. the least noisy image) on reproduction for "source" image data that has not undergone one or more previous compression/decompression cycles, it has been established that this is not necessarily the case for "non-source" image data. An image that has been compressed and decompressed once is referred to as a $1^{st}$ generation image, an image that has been subject to two previous compression/decompression cycles is known as a $2^{nd}$ generation and so on for higher generations.

Typically the noise in the image will be systematically higher across the full range of quantisation divisors for the 2nd generation reproduced image in comparison to the noise at a corresponding quantisation divisor for the $1^{st}$ generation reproduced image. This can be understood in terms of the DCT coefficient rounding errors incurred at each stage of quantisation. However, it is known that when the 2nd generation quantisation divisor is chosen to substantially equal to that used in the $1^{st}$ generation compression, the noise levels in the $2^{nd}$ generation reproduced image will be substantially equal to the noise levels in the $1^{st}$ generation reproduced image. Thus for non-source input image data the quantisation divisor having the smallest possible magnitude that meets a required data rate will not necessarily give the best reproduced image quality. Instead, a quantisation divisor substantially equal to that used in a previous compression/decompression cycle is likely to give the best possible reproduced image quality. Note however that the choice of quantisation divisor is constrained by the target bit rate associated with the particular communication channel which may vary from generation to generation.

In order to achieve the best possible image quality for multi-generation images it is important to set consistent quantisation parameters for each generation. The value of the quantisation parameters used in a previous generation will not necessarily be provided in the input bit stream supplied to the encoder. One of the quantisation parameters specified by the MPEG4 standard is known as DCT_PRECISION and its value is set for each image frame. DCT_PRECISION is used in quantisation of both the AC and the DC discrete cosine transform coefficients and in known encoding systems the assigned value of DCT_PRECISION is known to be subject to change for a given image frame from one generation to the next. This results in poor multi-generation stability of the quantisation divisors which ultimately results in reduced quality of the reproduced image quality for the $2^{nd}$ and higher generation images. Furthermore since the value of DCT_PRECISION is fixed prior to performing the series of trial quantisations a poor choice of DCT_PRECISION cannot be changed dynamically during the later part of the encoding process.

SUMMARY OF THE INVENTION

This invention provides a data compression apparatus for performing data compression on input data, the apparatus comprising:
- a quantisation parameter estimation arrangement for deriving an estimated value of a quantisation parameter used in a previous compression/decompression cycle applied to the input data, by detecting rounding effects in data values of at least a subset of the input data; and
- a parameter selection arrangement, responsive to the quantisation parameter estimation arrangement for selecting a quantisation parameter for use in compression of the input data.

The invention provides an elegantly simple and convenient way of detecting previous quantisation parameters used in data which is presented to the apparatus in an uncompressed form. Rounding effects of previous quantisation operations are detected. A corollary of this is that a detection can be made as to whether the data has previously been compressed or not.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
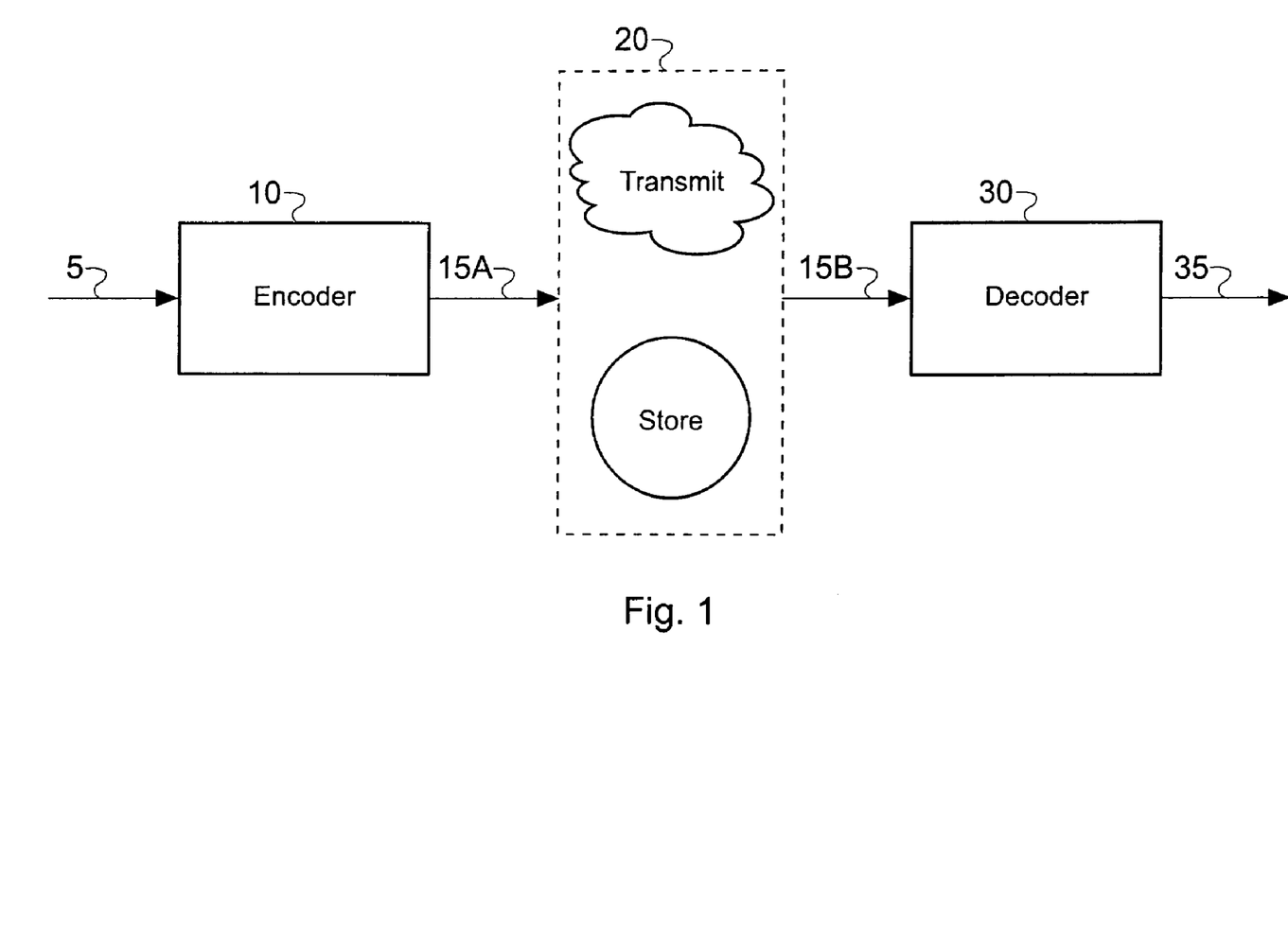
FIG. 1 is a schematic diagram of a compression encoder and a corresponding decoder for use with a data recording/reproducing device or a data transmission/reception system.

FIG. 1 is a schematic diagram of a data compression system. This system comprises an encoder 10, a data processing module 20 and a decoder 30. An input high definition video signal 5 is received by the encoder 10. The encoder 10 models the video image data to remove redundancy and to exploit its statistical properties. It produces output data symbols which represent the information in the input image data 5 in a compressed format. The encoder 10 outputs a compressed data signal 15A which is supplied as input to the data processing module 20 where it is either transmitted across a communication channel or stored on a recording medium. A compressed data signal 15B that was either read from the recording medium or received across a communication network is supplied to the decoder 30 that decodes the compressed data signal 15B to form a high definition image output signal 35.

Figure 2:
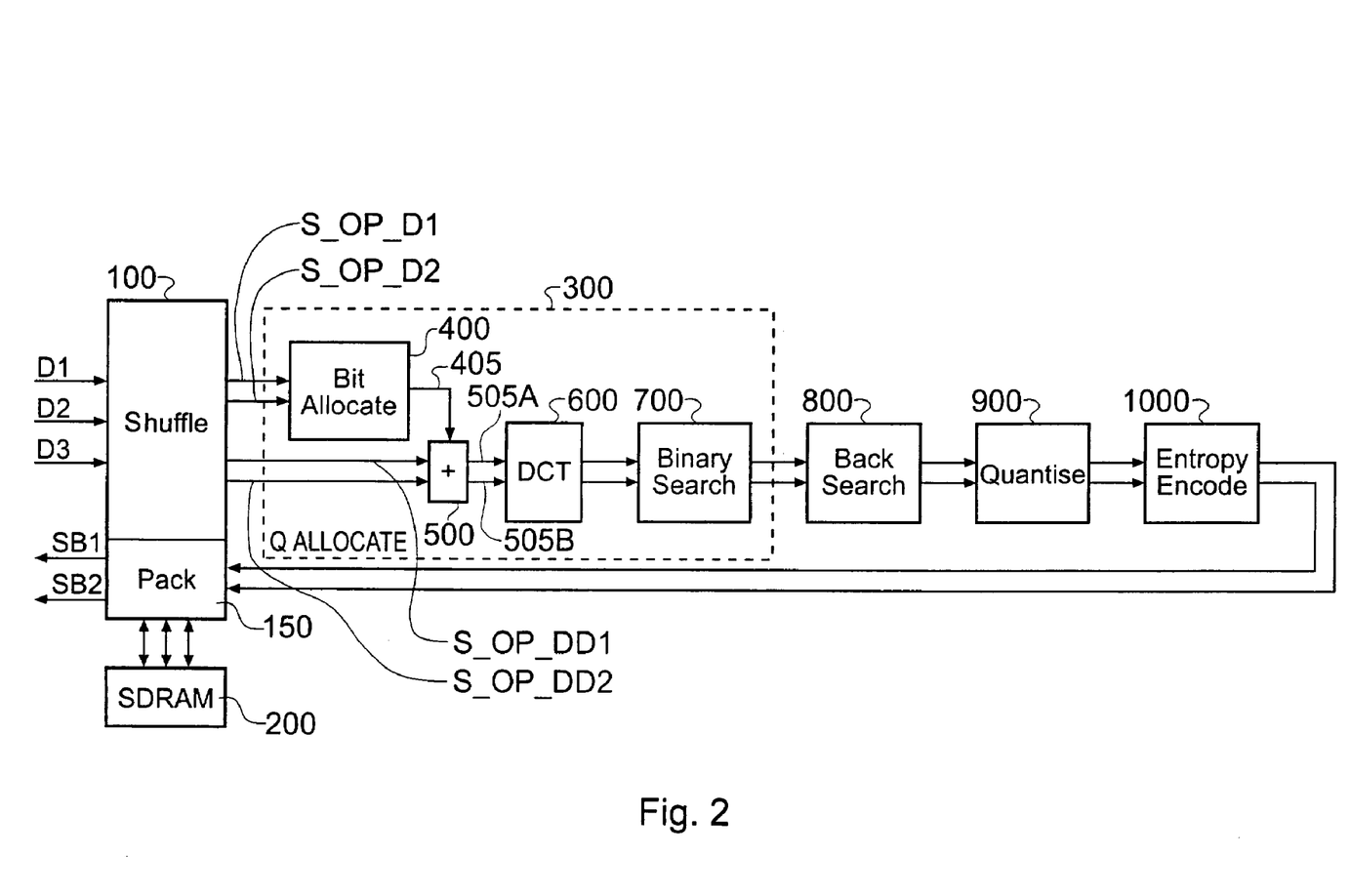
FIG. 2 schematically illustrates the bit rate reducing encoder of FIG. 1.

FIG. 2 schematically illustrates the bit rate reducing encoder of FIG. 1. Data signals D1, D2 and D3 correspond to RGB input channels for high definition video frames, which are supplied as input to a shuffle unit 100. It will be appreciated that in an alternative embodiment the data could be supplied in $YC_BC_R$ format. The images can be processed either in a progressive frame mode or in an interlaced field mode. The shuffle unit serves to distribute the input data into Macro-Block Units (MBUs). In this embodiment there are 40 MBUs per video frame, each of which comprises 204 MBs. Image samples of each input frame are temporarily written to an external SDRAM 200. During this shuffle write process the values for two quantisation divisor parameters Q_START and DCT_PRECISION, which are required for the subsequent encoding process, are calculated. Blocks of pixels are read from the external SDRAM 200 according to a predetermined shuffle ordering that serves to interleave the image data so that blocks of pixels which are adjacent in the input image frame are not read out at adjacent positions in the shuffle ordering.

The shuffle process alleviates the effect of data losses on the image reconstructed by the decoder apparatus. Pixel blocks that are adjacent to each other in the input video frame are separated in the shuffled bit stream. A short duration data loss in which a contiguous portion of the bit stream is corrupted may affect a number of data blocks but due to the shuffling these blocks will not be contiguous blocks in the reconstructed image. Thus data concealment can feasibly be used to reconstruct the missing blocks. The shuffle process improves the picture quality during shuttle playback. It also serves to reduce the variation in the quantisation parameters selected for the MBUs in an image frame by distributing input video data pseudo-randomly in the MBUs.

A current image frame is written to the external SDRAM 200 while a previous frame is read, in shuffled format, from the external SDRAM 200. The shuffle unit 100 generates two output signal pairs: a first pair comprising signals S_OP_D1 and S_OP_D2 and a second pair comprising signals S_OP_DD1 and S_OP_DD2 which contain the same MBU data but delayed by approximately one MBU with respect to the data of the first signal pair. This delay serves to compensate for the processing delay of a bit allocation module 400 belonging to a Q allocation unit 300. The first signal pair S_OP_D1 and S_OP_D2 is used by the Q allocation unit 300 to determine an appropriate coding mode and a quantisation divisor known as a Q_SCALE parameter for each MB of the MBU.

The output signals from the shuffle unit 100 are supplied to the Q allocation unit 300 that comprises the bit allocation module 400, a target insertion module 500, a DCT module 600 and a binary search module 700. The first output signal pair S_OP_D1 and S_OP_D2 from the shuffle unit 100 are supplied as input to the bit allocation module 400. The input to the bit allocation module 400 comprises raster scanned $8_H \times 8_V$ vertical blocks of 12-bit video samples.

The bit allocation module 400 performs a comparison between lossless differential pulse code modulation (DPCM) encoding and DCT quantisation encoding.

DPCM is a simple image compression technique that takes advantage of the fact that spatially neighbouring pixels in an image tend to be highly correlated. In DPCM the pixel values themselves are not transmitted. Rather, a prediction of the probable pixel value is made by the encoder based on previously transmitted pixel values. A single DPCM encoding stage involves a DPCM reformat, a DPCM transform and entropy encoding calculations.

By way of contrast, the DCT quantisation encoding involves a single DCT transform plus several stages of quantisation using a series of quantisation divisors, each quantisation stage being followed by Huffman entropy encoding calculations. In this embodiment 6 trial quantisation divisors are tested by the bit allocation module 400. Huffman coding is a known lossless compression technique in which more frequently occurring values are represented by short codes and less frequent values with longer codes. The DCT trial encoding stages optionally involve quantisation that is dependent on the "activity" of an image area. Activity is a measure calculated from the appropriately normalised pixel variance of an image block. Since harsher quantisation is known to be less perceptible to a viewer in image blocks having high activity the quantisation step for each block can be suitably adjusted according to its activity level. Taking account of activity allows for greater compression while maintaining the perceived quality of the reproduced image.

The DPCM and DCT quantisation trial encoding stages are used to calculate MB bit targets constrained by a predetermined frame target calculated from the required encoding bit rate. For each MB the mode (DCT or DPCM) that gives the fewest encoded bits is selected. The bit allocation module outputs a signal 405 to the target insertion module 500. The signal 405 comprises information about the encoding mode selected for each Macro-Block, a Q_SCALE quantisation divisor $Q_{BASE}$ to be used by a binary search module 700 and a bit target for each Macro-Block. The $Q_{BASE}$ value, encoding mode information and the bit target for each Macro-Block in the signal 405 is added to the bit stream of the delayed image data to which it corresponds by the target insertion module 500. The target insertion module 500 outputs two signals 505A and 505B which are supplied as inputs to the DCT module 600.

The DCT module 600 again calculates DCT coefficients, this time based on the delayed version of the image data. The DCT module 600 outputs the data to the binary search module 700. The binary search module 700 performs a second stage of Q allocation for each of the DCT mode MBs and uses a binary search technique to determine an appropriate quantisation divisor for each Macro-Block. The binary search module 700 determines the quantisation divisor to a higher resolution (within a given range of available quantisation divisors) than the resolution used by the bit allocation module 400. In fact $Q_{BASE}$ is used to define a starting point for a five stage binary search that results in the selection of a higher resolution quantisation step $Q_{ALLOC}$ for each DCT mode Macro-Block. The DPCM mode Macro-Blocks are routed through the binary search module 700 via a bypass function so that the data is unaltered on output.

The output from the binary search module 700 that includes the value $Q_{ALLOC}$ for each DCT mode Macro-Block is supplied to a back search module 800. The back search module 800 checks that the $Q_{ALLOC}$ value chosen for each MB is the "best" quantisation scale for encoding. As explained in the introduction, for image data that has undergone at least one previous encode/decode cycle, the least harsh quantisation that is achievable for a given target bit count will not necessarily give the smallest possible quantisation error for the Macro-Block. Instead, the smallest quantisation error is likely to be achieved by using a quantisation divisor that is substantially equal to the quantisation divisor used in the previous encode/decode cycle. Accordingly, the back search module 800 estimates the quantisation error for a range of quantisation divisors starting at $Q_{ALLOC}$ and working towards harsher quantisations. It determines the quantisation step $Q_{FINAL}$ that actually produces the smallest possible quantisation error. The trial quantisations are performed on DCT mode Macro-Blocks only and a bypass function is provided for DPCM mode macroblocks.

The output from the back search module 800 which includes DCT blocks generated by the DCT encoder 600 together with the selected quantisation step $Q_{FINAL}$ is supplied to a quantiser 900 where the final quantisation is performed. The quantisation procedure is as follows:

In DCT mode encoding the single DC coefficient of each $8_H \times 8_V$ block is quantised according to the equation:

$$Q(DC) = DC/(DC\_{QUANT} * DCT\_{SCALER})$$

where DC is the unquantised coefficient, DC_QUANT is a quantisation factor that is set by the system and is used to quantise all of the MBs. DC_QUANT is determined from DC_PRECISION as shown in the table below

| DC_PRECISION | 00 | 01 | 10 | 11 |
|---|---|---|---|---|
| DC_QUANT | 8 | 4 | 2 | 1 |

DC_PRECISION is set to a fixed value, preferably 00, for each frame. DCT_SCALER is a quantisation factor determined by the DCT_PRECISION index such that DCT_SCALER= $2^{DCT\_PRECISION}$. In this embodiment a convention is used where DCT_PRECISION has the four possible values (0, 1, 2, 3) and 3 corresponds to the most harsh quantisation. Note that a different convention is used in the MPEG4 Studio Profile standard where DCT_PRECISION=0 corresponds to the most harsh quantisation whilst DCT_PRECISION=3 corresponds to the least harsh quantisation.

Figure 3:
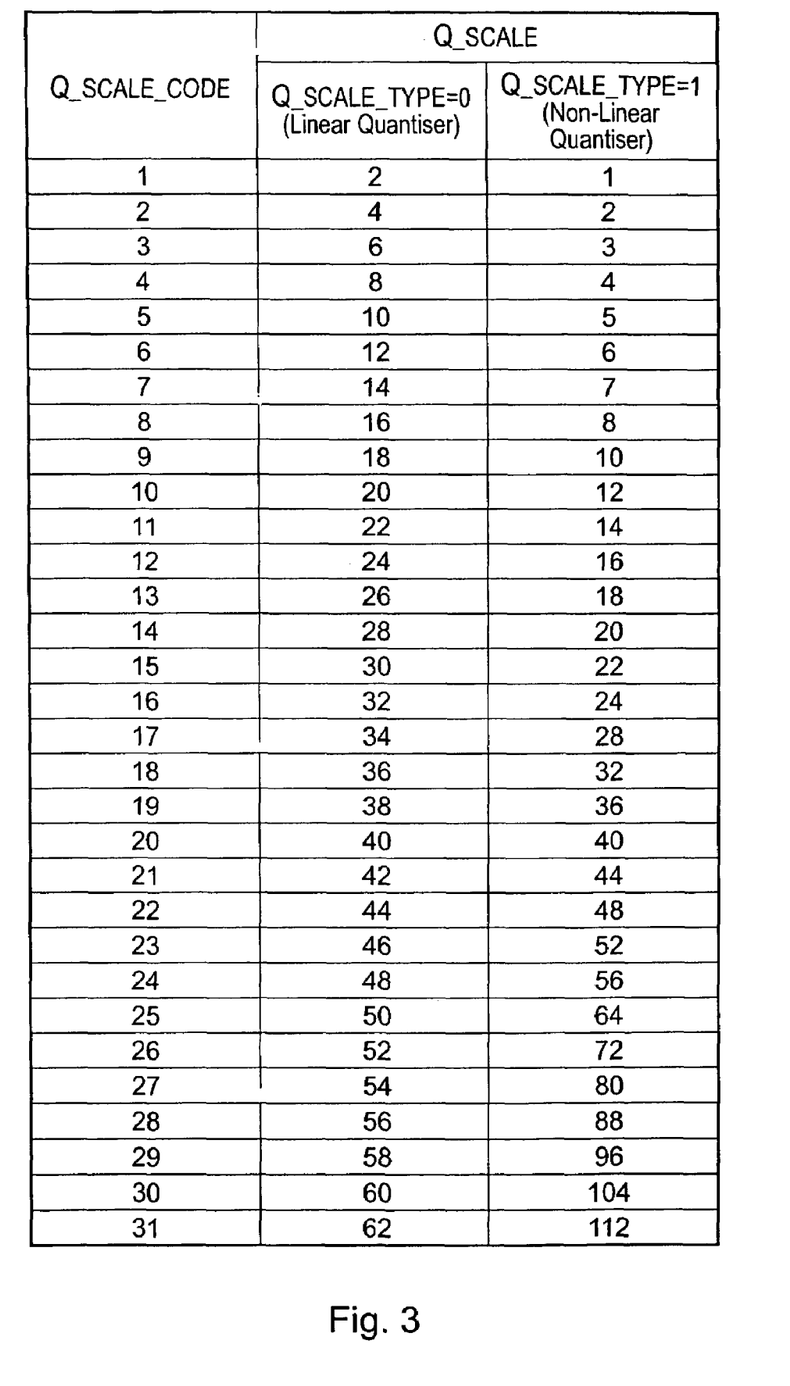
FIG. 3 is a table of parameters used in the bit rate reduction process of the encoder of FIG. 2.

Similarly the 63 AC coefficients of the block are quantised according to the equation:

$$Q(AC) = (AC*16)/(Q\_{MATRIX} * AC\_{QUANTISE} * DCT\_{SCALER})$$

where AC is the unquantised coefficient and Q_MATRIX is an array of 64 weights, one for each element of the DCT block. AC_QUANTISE is the product of Q_SCALE and NORM_ACT. Q_SCALE is a factor corresponding to either a linear quantiser scale or a non-linear quantiser scale, as specified by a Q_SCALE_TYPE. Each of the Q_SCALE_TYPEs comprises 31 possible values denoted Q_SCALE_CODE(1) to Q_SCALE_CODE (31). The table of FIG. 3 shows the Q_SCALE values associated with each Q_SCALE_TYPE for all 31 Q_SCALE_CODEs. In the above equation NORM_ACT is a normalised activity factor that lies in the range 0.5 to 2.0 for "activity on" but is equal to unity for "activity off". AC_QUANTISE=NORM_ACT* Q_SCALE is rounded up to the nearest Q_SCALE (i.e. a Q_SCALE that corresponds to one of the Q_SCALE_CODES in the Table of FIG. 3) before it is included as part of the divisor.

The results of the quantisations Q(DC) and Q(AC) are rounded using the known technique of normal infinity rounding. This technique involves rounding positive numbers less than 0.5 down (towards zero) and positive numbers greater than or equal to 0.5 up (towards plus infinity). Whereas negative numbers greater than −0.5 are rounded up (towards zero) and negative numbers less than or equal to −0.5 are rounded down (towards minus infinity).

The bit allocation module 400, the binary search module 700 and the back search module 800 each implement a quantisation process in accordance with that implemented by the quantise module 900 as detailed above. However in the binary search module 700 and the back search module 800 the factor NORM_ACT is always set equal to 1. Only during the bit allocation process carried out by the bit allocation module 400, does NORM_ACT take a value other than 1. Since the MB targets generated during bit allocation take account of activity, it need not be taken into account at subsequent stages.

The quantised data are output from the quantise module 900 and are subsequently supplied to an entropy encoder 1000 where lossless data compression is applied according to the standard principles of entropy encoding. In this embodiment Huffman encoding is used.

The output from the entropy encoder 1000 is supplied to a packing module 150. The packing module 150 together with the external SDRAM 200 is used to pack the variable length encoded data generated by the entropy encode module 1000 into fixed length sync-blocks. A sync-block is the smallest data block that is separately recoverable during reproduction of the image.

The packing function is implemented by manipulation of the SDRAM read and write addresses. Each MBU is allocated a fixed packing space in the SDRAM which is then subdivided into a nominal packing space for each MB. The total length of each MB must also be stored and this can either be calculated from the individual word lengths or passed directly from the entropy encode module 1000 to the packing module 150. The output from the encoder 10 comprises sync-block 1 data output SB1 and sync-block 2 data output SB2. An indication of the quantisation divisors used in the encoding process is also transmitted to the decoder 30.

Figure 4:
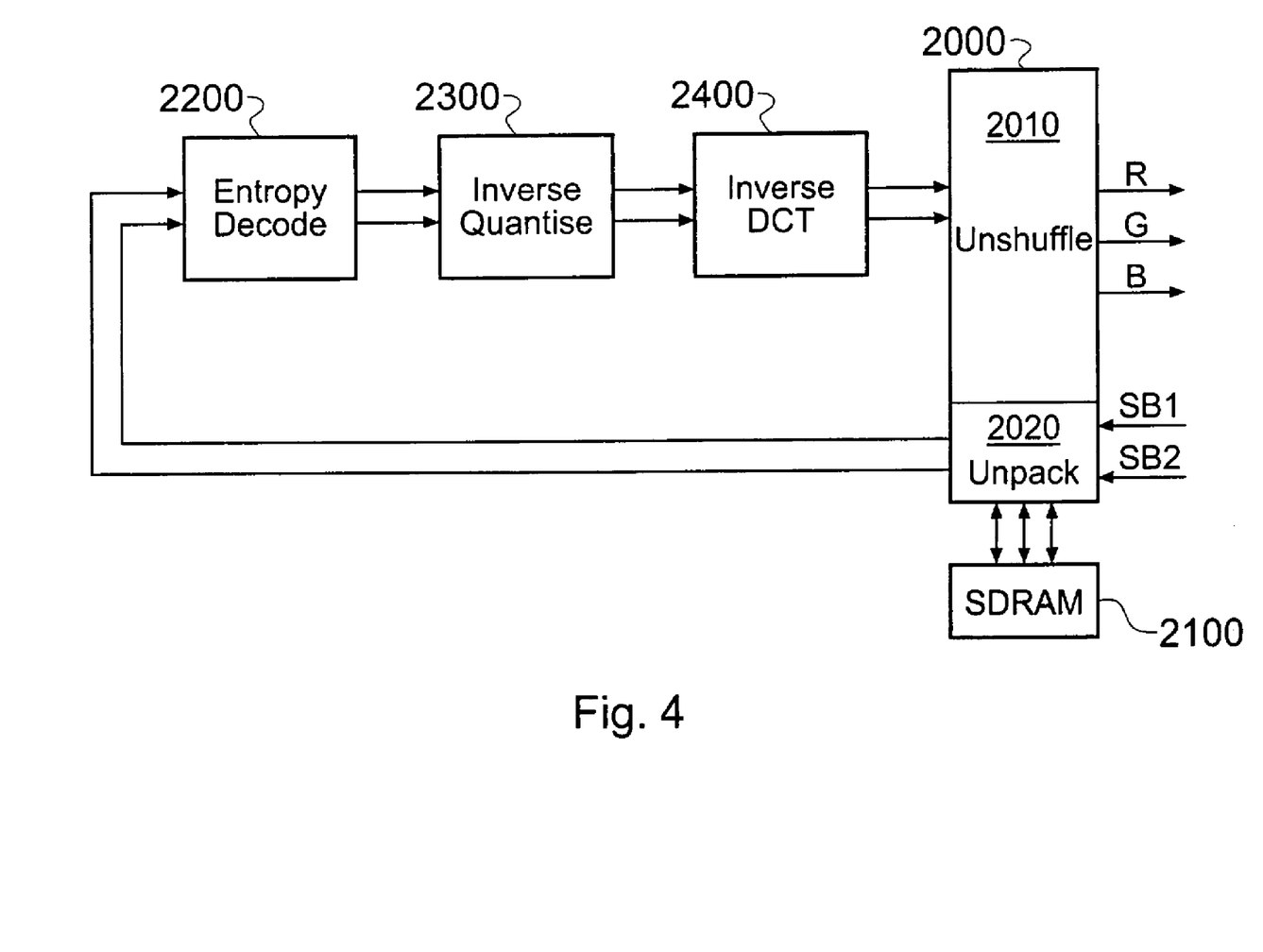
FIG. 4 schematically illustrates the decoder of FIG. 1.

FIG. 4 schematically illustrates the decoder 30 of FIG. 1. The decoder is operable to reverse the encoding process and comprises an unshuffle unit 2010, an unpack unit 2020, an external SDRAM 2100, an entropy decoding module 2200, an inverse quantiser 2300 and an inverse DCT module 2400. The sync-block data signals SB1 and SB2 that are either read from the recording medium or received across a data transfer network are received by the unpack unit 2020 that implements an unpacking function by writing to and reading from the external SDRAM 2100. The unpacked data is supplied to the entropy decoder that reverses the Huffman coding to recover the quantised coefficients which are supplied to the inverse quantiser 2300. The inverse quantiser 2300 uses information supplied by the encoder 10 about the quantisation divisors and multiplies the quantised coefficients by the appropriate quantisation divisors to obtain an approximation to the original DCT coefficients. This inverse quantisation process does not restore the original precision of the coefficients so quantisation is a "lossy" compression technique. The output from the inverse quantiser 2300 is supplied to the inverse DCT module 2400 that processes each block of frequency domain DCT coefficients using an inverse discrete cosine transform to recover a representation of the image blocks in the spatial domain. The output of the inverse DCT module 2400 will not be identical to the pre-encoded pixel block due to the information lost as a result of the quantisation process. Finally the output of the inverse DCT module 2400 is supplied to the unshuffle unit 2000 where the data is unshuffled to recover the image block ordering of the pre-encoded image. The output of the unshuffle unit 2010 comprises the three colour component video signals RGB from which the image can be reconstructed.

Figure 5A:
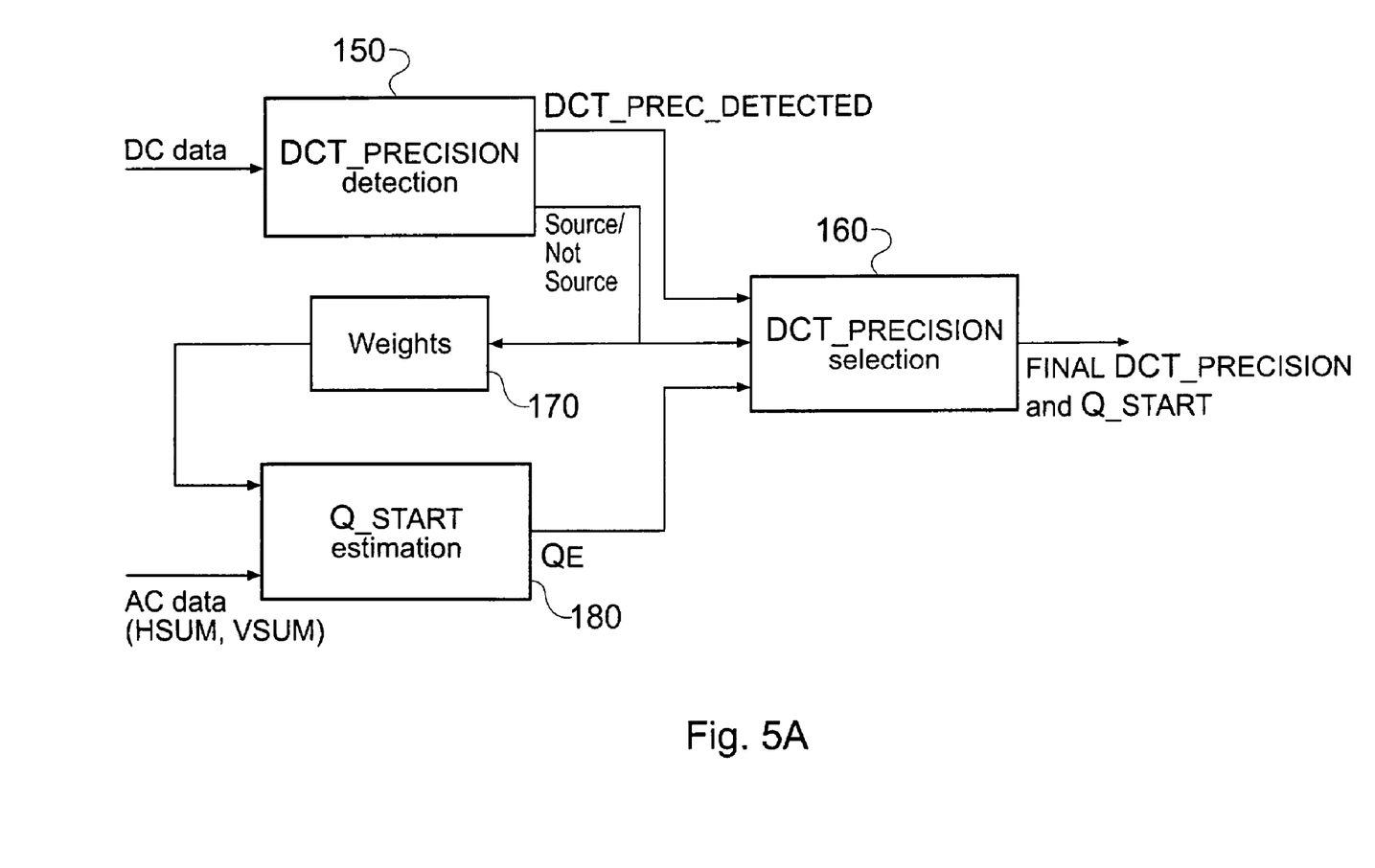
FIG. 5A schematically illustrates a parameter estimation circuit according to a first embodiment of the invention.

FIG. 5A schematically illustrates a parameter estimation circuit according to a first embodiment of the invention. This parameter estimation circuit is implemented in the shuffle module 100 of the encoder of FIG. 2. The parameter estimation circuit comprises a DCT_PRECISION detection module 150, a DCT_PRECISION selection module 160, a weights module 170 and a Q_START estimation module 180.

As explained above the DCT_PRECISION index, which is used in quantising all of the DCT coefficients, has four possible values 0, 1, 2, 3 and is specified on a frame by frame basis. The value DCT_SCALER=$2^{DCT\_PRECISION}$ is the quantisation divisor associated with DCT_PRECISION. During the encoding process it is important to correctly determine the DCT_PRECISION index. Furthermore it is necessary to provide a Q_SCALE estimate. Q_START is an estimate of the ideal Q_SCALE for the field or frame at the chosen DCT_PRECISION and is used as a reference scale for the lowest resolution trial quantisations performed by the bit allocation module 400.

The parameter estimation circuit of FIG. 5A analyses the input image data to provide estimates for the DCT_PRECISION and for Q_START. This circuit also determines whether the video data is "source" data that has not previously undergone any encode/decode cycle or "not source" data that has undergone at least one previous encode/decode cycle. The value of DCT_PRECISION is determined field by field or frame by frame in this embodiment. However, in alternative embodiments the value of DCT_PRECISION could be calculated for each macroblock or other groups of macroblocks.

The DCT_PRECISION detection module 150 determines whether the input video data is source or non-source and, in the case of non-source data, it detects the DCT_PRECISION index that was used in a previous encode/decode cycle. The value of DCT_PRECISION affects the quantisation of both DC and AC coefficients. Given that the value of DC_QUANT is known (DC_PRECISION set to fixed value 00 for each frame so that DC_QUANT=8 for this embodiment) it is possible to detect the value of DCT_PRECISION used in a previous generation by analysing the DC rounding effects. The DCT_PRECISION detection module 150 is supplied with input video data and performs an analysis of the DC quantisation of this input data. For each DCT block of the image field or frame the six Least Significant Bit (LSB) values for each of the 64 pixels of the block are summed to generate a 6-bit value $DC_{[5:0]}$ for each block. A frequency of occurrence of particular $DC_{[5:0]}$ values is built up according to the following algorithm:

$S_0$=number of occurrences of $DC_{[5:0]}$=00 0000

$S_1$=number of occurrences of $DC_{[5:0]}$=10 0000

$S_2$=number of occurrences of $DC_{[5:0]}$=x1 0000

$S_3$=number of occurrences of $DC_{[5:0]}$=xx1000

Figure 6:
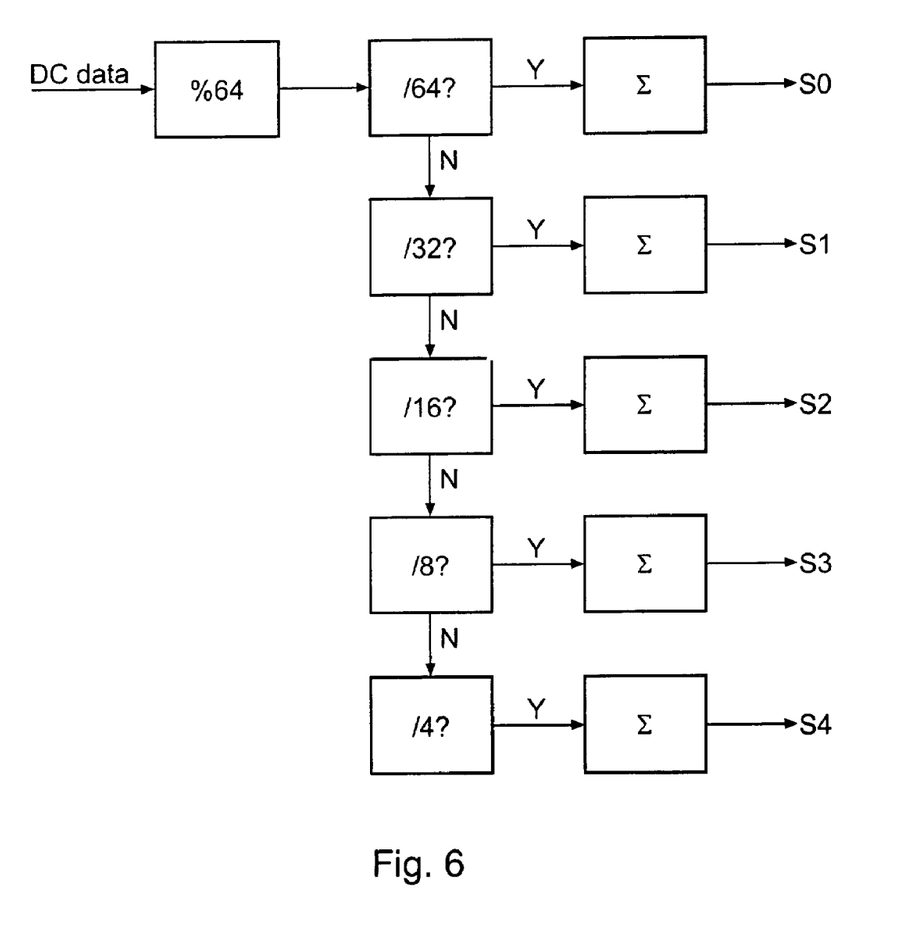
FIG. 6 schematically illustrates a frequency of occurrence calculation performed by a DCT_PRECISION detection module of the parameter estimation circuit of FIG. 5A.

$S_4$=number of occurrences of $DC_{[5:0]}$=xx x100 where "x" represents either 0 or 1. Effectively, the number of instances of the $DC_{[5:0]}$ being: divisible by 64 corresponds to the sum $S_0$; divisible by 32 (but not 64) corresponds to the sum $S_1$; divisible by 16 (but not 32) corresponds to the sum $S_2$; divisible by 8 (but not 16) corresponds to the sum $S_3$; and divisible by 4 (but not 8) corresponds to the sum $S_4$. FIG. 6 schematically illustrates how frequency of occurrence of particular $DC_{[5:0]}$ values is calculated.

In this embodiment the five sums $S_0$ to $S_4$ include all the DCT blocks from all video components. However, in alternative embodiments the sums $S_0$ to $S_4$ may be calculated separately for each component (RGB or YCbCr) and the final DCT_PRECISION decisions can be combined using, for example, a majority decision.

Once the sums $S_0$ to $S_4$ have been calculated, the DCT_PRECISION used at the previous generation is detected using four predetermined threshold values, $th_1$ to $th_4$, to produce an estimated value DCT_PREC_DETECTED. The following pseudocode defines the algorithm used:

| | |
|---|---|
| if $(S_0 > th_1 * S_1)$ | DCT_PREC_DETECTED = 3 |
| else if $(S_0 + S_1 > th_2 * S_2)$ | DCT_PREC_DETECTED = 2 |
| else if $(S_0 + S_1 + S_2 > th_3 * S_3)$ | DCT_PREC_DETECTED = 1 |
| else if $(S_0 + S_1 + S_2 + S_3 > th_4 * S_4)$ | DCT_PREC_DETECTED = 0 |
| else | Source Data |

This algorithm assumes that DC_QUANT=8 (DC_PRECISION=00) in both the previous generation and in the current generation.

Since $Q(DC)=DC/DC\_QUANT*2^{DCT\_PREC}$ and DC_QUANT=8, if we detect a divisor of e.g. 8 on the DC data then we deduce that there was no further quantisation so that DCT_PREC_DETECTED=0 in the above algorithm. It will be appreciated that the algorithm should be adapted to take account of the value of DC_QUANT in both the previous and the current generation.

In the above algorithm, if the value of the sum $S_0$ is greater than the product of a threshold value $th_1$ and the sum $S_1$ then the detected divisor of DC data is $64=8*2^3$ so the algorithm sets DCT_PREC_DETECTED=3 which corresponds to the most harsh DCT_PRECISION quantisation. If the value of $(S_0+S_1)$ is greater than the product of a threshold value $th_2$ and the sum $S_2$ then the detected divisor of DC data is $32=8*2^2$ so the algorithm sets DCT_PREC_DETECTED=2. If the value of $(S_0+S_1+S_2)$ is greater than the product of a threshold value $th_3$ and the value of the sum $S_3$ then the detected divisor of DC data is $16=8*2$ so the algorithm sets DCT_PREC_DETECTED=1. Finally, if the value of $(S_0+S_1+S_2+S_3)$ is greater than the product of a threshold value $th_4$ and the value of the sum $S_4$ then the detected divisor of DC data is 8 so the algorithm sets DCT_PREC_DETECTED=0 which corresponds to the least harsh DCT_PRECISION quantisation. The threshold values for this particular embodiment are $th_1=th_2=th_3=16$ and $th_4=2$. The threshold values are determined empirically by performing calculations on test image sequences. This algorithm essentially quantifies the severity of the rounding effects on the pixel values in order to detect the previous value of the quantisation divisor DCT_PRECISION.

The DCT_PRECISION detection module 150 outputs the value DCT_PREC_DETECTED and supplies it as input to the DCT_PRECISION selection module 160 and further outputs a "source"/"not source" decision and this information is supplied as input to the weights module 170 and the DCT_PRECISION selection module 160. The weights module 170 supplies weighting factors for the calculation performed by the Q_START estimation module 180. The weighting factors implemented by the weights module 170 depend on whether the video data has been classified as "source" or "not source".

Figure 7:
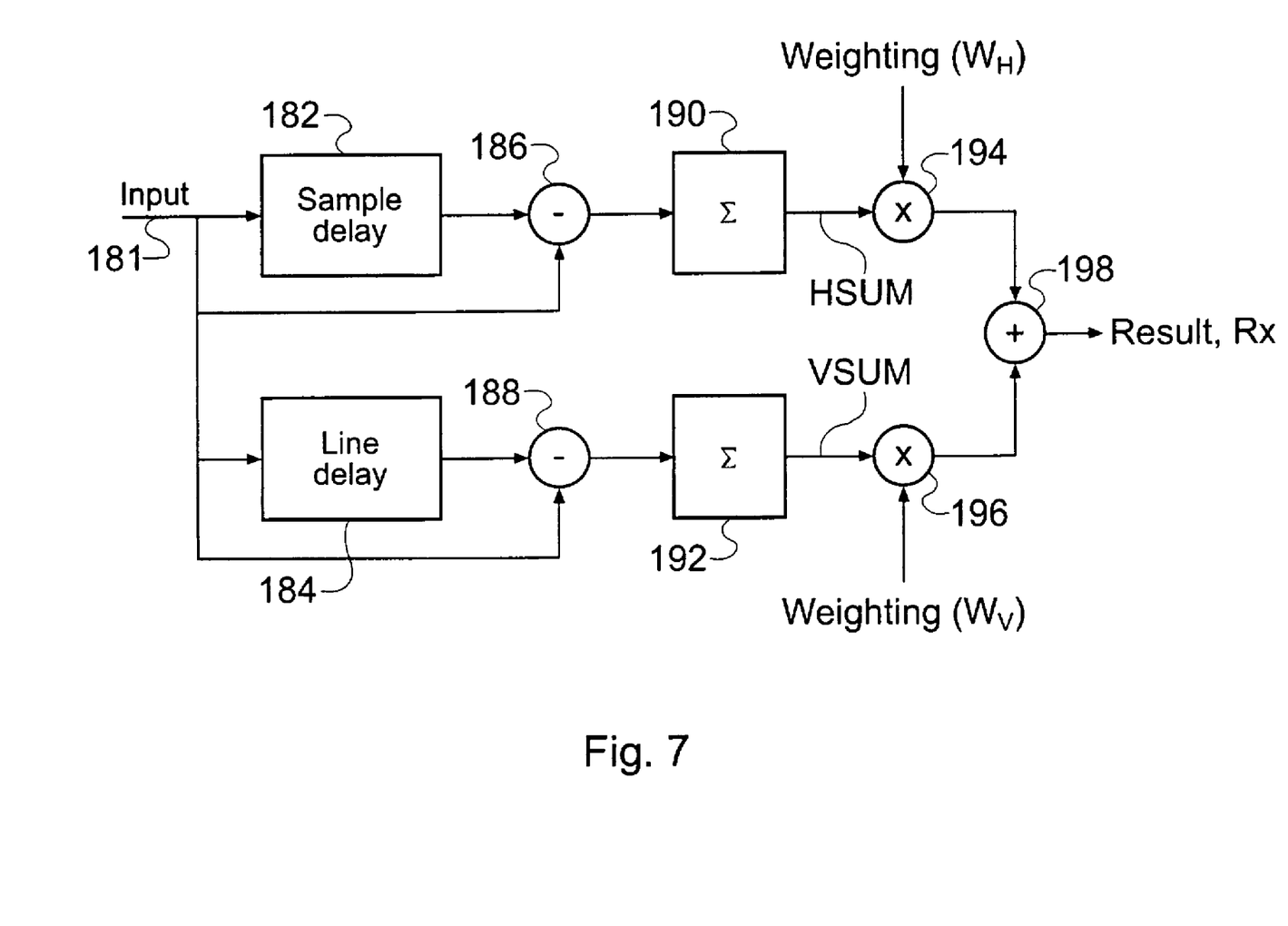
FIG. 7 schematically illustrates a portion of the Q start estimation module of FIG. 5A.

The Q_START estimation module 180 calculates an estimated Q_SCALE value denoted $Q_E$, for each frame or field. FIG. 7 schematically illustrates a portion of the Q_START estimation module of FIG. 5A. FIG. 7 relates to the processing performed on a single video component "X". The results for each channel, of which there are three for RGB mode processing, but two for YC mode processing, are combined to produce the value $Q_E$ for each frame or field. In FIG. 7 an input signal 181 for a single video component is supplied both directly and via a sample delay module 182 to a subtractor 186. The subtractor calculates differences between horizontally adjacent pixels and supplies the results to a summing module 190 which calculates the sum of horizontal pixel differences HSUM for the signal component of the input frame/field. The input signal 181 is also supplied to a further subtractor 188, both directly and via a line delay module 184. The subtractor 188 calculates differences between vertically adjacent pixels and supplies the results to a further summing module 192 which calculates the sum of vertical pixel differences VSUM for the signal component of the input frame/field.

The horizontal and vertical pixel differences across Macro-Block boundaries are excluded from HSUM and VSUM. Since the data is quantised Macro-Block by Macro-Block, different Macro-Blocks will typically have different quantisation parameters therefore pixel differences across Macro-Block boundaries are irrelevant in estimating how easily the data can be compressed. By excluding pixel differences across Macro-Block boundaries the accuracy of the estimate $Q_E$ can be improved. Pixel differences across DCT block boundaries are also excluded from HSUM and VSUM. DCT is performed DCT-block by DCT-block so the difference between two DCT-blocks is never actually encoded. The output HSUM of the summing module 190 is supplied to a multiplier 194 where it is multiplied by a horizontal weighting factor $W_H$. Similarly, the output VSUM of the summing module 190 is supplied to a multiplier 194 where it is multiplied by a vertical weighting factor $W_V$.

The weighting factors $W_H$ and $W_V$ were those values supplied to the Q_START estimation module by the weights module 170. In this embodiment of the invention the respective values of $W_H$ and $W_V$ are different for "source data" and for "not source" data. However, in alternative embodiments $W_H$ and $W_V$ are set to the same respective values for "source data" and for "not source" data and the calculated value of $Q_E$ is scaled by a scaling factor dependent on whether or not image data is source data.

The weighting factors $W_H$ and $W_V$ are selected by performing tests on training images during which the value Q_START, which is a scaled value $Q_E$ calculated by the DCT precision selection module 160, is compared with the "ideal Q" which is the flat quantiser required to compress the image to the desired bit rate. The weighting factors $W_H$ and $W_V$ are selected such that the discrepancy between Q_START and the ideal Q is reduced. Different values of the weighting factors $W_H$ and $W_V$ are used for each video signal component. Returning to the circuit of FIG. 7, an adder 198 calculates the value $R_X$ for each video component X according to the formula $R_X=W_H\times HSUM+W_V\times VSUM$ where X is R,G,B,Y or C. The quantiser estimate $Q_E$ for each field or frame is given by the sum $Q_E=R_R+R_G+R_B$ in RGB mode processing or by the sum $Q_E=R_Y+R_C$ in YC mode processing. The discrepancy between the ideal Q and $Q_E$ is used to provide an estimated error on Q_START.

The Q_START estimation module 180 of FIG. 5A supplies the DCT_PRECISION selection circuit 160 with a signal specifying the value of $Q_E$ for each frame or field. $Q_E$ is effectively an estimate of the Q_SCALE that would be appropriate at DCT_PRECISION=0 which corresponds to the least harsh quantisation. The DCT_PRECISION selection circuit 160 determines a value Q_START for each field or frame in dependence upon $Q_E$. A value of the DCT_PRECISION index is estimated for each field/frame according to the numerical value of $Q_E$ as shown in table 1 below. Recall that the quantisation Q(AC) of the AC coefficients involves division by the product of factors Q_SCALE*NORM_ACT*DCT_SCALER, where DCT_SCALER=$2^{DCT\_PRECISION}$. It follows that for "activity off" (NORM_ACT=1) the Q_SCALE estimate Q_START is given by $Q_E$/DCT_SCALER.

Table 2 shows the corresponding relationship between $Q_E$ and Q_START for "activity on". In this case the factor NORM_ACT which lies is in the range 0.5 to 2.0 must be taken into account in order to avoid selecting values of Q_START that are outside the allowable range of Q_SCALE.

TABLE 1

DCT_PRECISION Selection (Activity Off)

| Estimated Quantiser, $Q_E$ | Q_SCALE_TYPE | DCT_PRECISION | Q_START |
|---|---|---|---|
| $Q_E <= 38$ | Linear | 0 | $Q_E$ |
| $38 < Q_E <= 100$ | Linear | 1 | $Q_E/2$ |
| $100 < Q_E <= 224$ | Linear | 2 | $Q_E/4$ |
| $224 < Q_E <= 464$ | Linear | 3 | $Q_E/8$ |
| $464 < Q_E$ | non-linear | 3 | $Q_E/8$ |

TABLE 2

DCT_PRECISION Selection (Activity On: 0.5-2)

| Estimated Quantiser, $Q_E$ | Q_SCALE_TYPE | DCT_PRECISION | Q_START |
|---|---|---|---|
| $Q_E <= 36$ | Linear | 1 | $Q_E/2$ |
| $36 < Q_E <= 96$ | Linear | 2 | $Q_E/4$ |
| $96 < Q_E <= 208$ | Linear | 3 | $Q_E/8$ |
| $208 < Q_E$ | non-linear | 3 | $Q_E/8$ |

Recall that DCT_PRECISION=0 corresponds to the least harsh quantisation while DCT_PRECISION=3 corresponds to the most harsh quantisation. The Q_SCALE_TYPE in the second column of Tables 1 and 2 indicates whether the values associated with the 31 available Q_SCALE_CODES represent a linear sequence or a non-linear sequence. The non-linear sequence extends to quantisation divisors of larger magnitude than those of the linear sequence.

The reasoning used to determine the appropriate range of $Q_E$ corresponding to each value of DCT_PRECISION in Table 1 and in Table 2 will now be described in detail.

First consider Table 1 which corresponds to "activity off" mode. Using the linear Q_SCALE_TYPE of the table in FIG. 3, it can be seen that the maximum Q_SCALE available is 62.

At DCT_PRECISION=0 there is an estimated error of ±24 on Q_START. Therefore, to allow for this possible error, DCT_PRECISION=0 is not chosen unless Q_START≦38 (=62−24). This means that if the error on Q_START really is −24 and the real Q_SCALE required is 62 then this can still be achieved at the chosen DCT_PRECISION (0). Since at DCT_PRECISION=0, Q_START=$Q_E$, the value DCT_PRECISION=0 is chosen if QE≦38.

At DCT_PRECISION=1, there is an estimated error of ±12 on Q_START. Therefore, to allow for this possible error, DCT_PRECISION=1 should not be chosen unless Q_START≦50 (=62−12). Since at DCT_PRECISION=1, Q_START=$Q_E/2$, it follows that the value DCT_PRECISION=1 is chosen if $Q_E$≦100 (50*2).

At DCT_PRECISION=2 there is an estimated error of ±6 on Q_START. Therefore, to allow for this possible error, DCT_PRECISION=2 should not be chosen unless Q_START≦56 (=62−6). Since at DCT_PRECISION=2, Q_START=$Q_E/4$, it follows that the value DCT_PRECISION=2 is chosen if $Q_E$≦224 (56*4).

At DCT_PRECISION=3 there is an estimated error of ±3 on Q_START. Therefore, to allow for this possible error, DCT_PRECISION=3 should not be chosen unless Q_START≦58 (=62−3, rounded down to nearest Q_SCALE allowed). Since at DCT_PRECISION=3, Q_START=$Q_E/8$, it follows that the value DCT_PRECISION=3 is chosen if $Q_E$≦464 (58*8).

Otherwise the non-linear Q_SCALE_TYPE must be chosen at DCT_PRECISION=3 to allow more harsh quantisation.

Now consider Table 2 which corresponds to "activity on" mode. As for Table 1, referring to the linear Q_SCALE_TYPE of the table in FIG. 3, it can be seen that the maximum Q_SCALE available is 62. For "activity on" this is actually the maximum value for the product Q_SCALE*NORM_ACT, since this value is turned into a Q_SCALE_CODE before being applied.

NORM_ACT has a range of x0.5 to x2 which must be taken account of for activity on. Therefore, to allow for the possible x2 effect of NORM_ACT, the maximum value of Q_SCALE is taken to be 30, (note from FIG. 3 that a Q_SCALE of 31 is not allowed).

At DCT_PRECISION=0 there is an estimated error of ±24 on Q_START. Therefore, to allow for this possible error, DCT_PRECISION=0 should not be chosen unless Q_START≦6 (=30−24). However, 6 is below the minimum allowable Q_SCALE of 8 at DCT_PRECISION=0. It follows that the value DCT_PRECISION=0 cannot be chosen with activity on.

At DCT_PRECISION=1 there is an estimated error of ±12 on Q_START. Therefore, to allow for this possible error, DCT_PRECISION=1 should not be chosen unless Q_START≦18 (=30−12). Since at DCT_PRECISION=1, Q_START=$Q_E/2$, it follows that the value DCT_PRECISION=1 is chosen if $Q_E$≦36 (18*2).

At DCT_PRECISION=2, there is an estimated error of ±6 on Q_START. Therefore, to allow for this possible error, DCT_PRECISION=2 should not be chosen unless Q_START≦24 (=30−6). Since at DCT_PRECISION=2, Q_START=$Q_E/4$, it follows that the value DCT_PRECISION=2 is chosen if $Q_E$≦96 (24*4).

At DCT_PRECISION=3, there is an estimated error of ±3 on Q_START. Therefore, to allow for this possible error, DCT_PRECISION=3 should not be chosen unless Q_START≦26 (=30−3, rounded down to nearest Q_SCALE allowed). Since at DCT_PRECISION=3, Q_START=$Q_E/8$, it follows that the value DCT_PRECISION=3 is chosen if $Q_E$≦208 (26*8).

Otherwise, the non-linear Q_SCALE_TYPE must be chosen at DCT_PRECISION=3 to allow harsher quantisation.

For input images categorised as "not source" the parameter estimation circuit calculates two separate estimates for the estimated value of DCT_PRECISION corresponding to a previous encode/decode cycle. The first estimate for DCT_PRECISION corresponds to the value DCT_PREC_DETECTED as calculated from the 6 least significant bits by the DCT_PRECISION detection module 150. The second estimate for DCT_PRECISION is obtained from the parameter $Q_E$ that was calculated from sums of horizontal and vertical pixel differences H$_{SUM}$ and V$_{SUM}$. We shall refer to this second estimate as DCT_PREC_Q$_E$. The values DCT_PREC_Q$_E$ and DCT_PREC_DETECTED may indicate different decisions for the most appropriate value of DCT_PRECISION. If the two estimated values are not in agreement then a logical decision must be made to determine the final DCT_PRECISION value.

It is considered that when the value of Q$_E$ used to determine DCT_PREC_Q$_E$ is "close" to a boundary of one of the Q$_E$ ranges as defined in the first column of Table 1 (for activity off) or Table 2 (for activity on) then DCT_PREC_DETECTED is considered to be more reliable than DCT_PREC_Q$_E$. In determining whether or not Q$_E$ is close to the boundary account is taken of the likely errors in the Q_SCALE estimate Q$_E$.

Q$_E$ is determined for each field/frame and is subject to two main types of variation. The variation in Q$_E$ from frame to frame in an image sequence is termed "sequence jitter" whereas the variation in Q$_E$ for a given image frame from one generation to the next is termed "generation jitter". Image quality can be improved if the DCT_PRECISION values are stabilised such that jitter is reduced. In the present embodiment when determining the final DCT_PRECISION from DCT_PREC_DETECTED and DCT_PREC_Q$_E$, allowance is made for generation jitter. Note that although DCT_PREC_DETECTED is taken into account, it may still be necessary to select a different DCT_PRECISION from one generation to the next in circumstances where the required bit rates of the previous and current encoding differ considerably. In general, the required bit rates corresponding to previous encode/decode cycles will not be available during the current encoding process.

The final values of DCT_PRECISION and Q_START are determined for non-source images in dependence upon a comparison between DCT_PREC_DETECTED and DCT_PREC_Q$_E$. The comparison takes into account empirically determined values of maximum possible positive jitter $J_+^{max}$ and minimum possible negative jitter $J_-^{max}$, which for this embodiment, are both set equal to 5.

Figure 8:
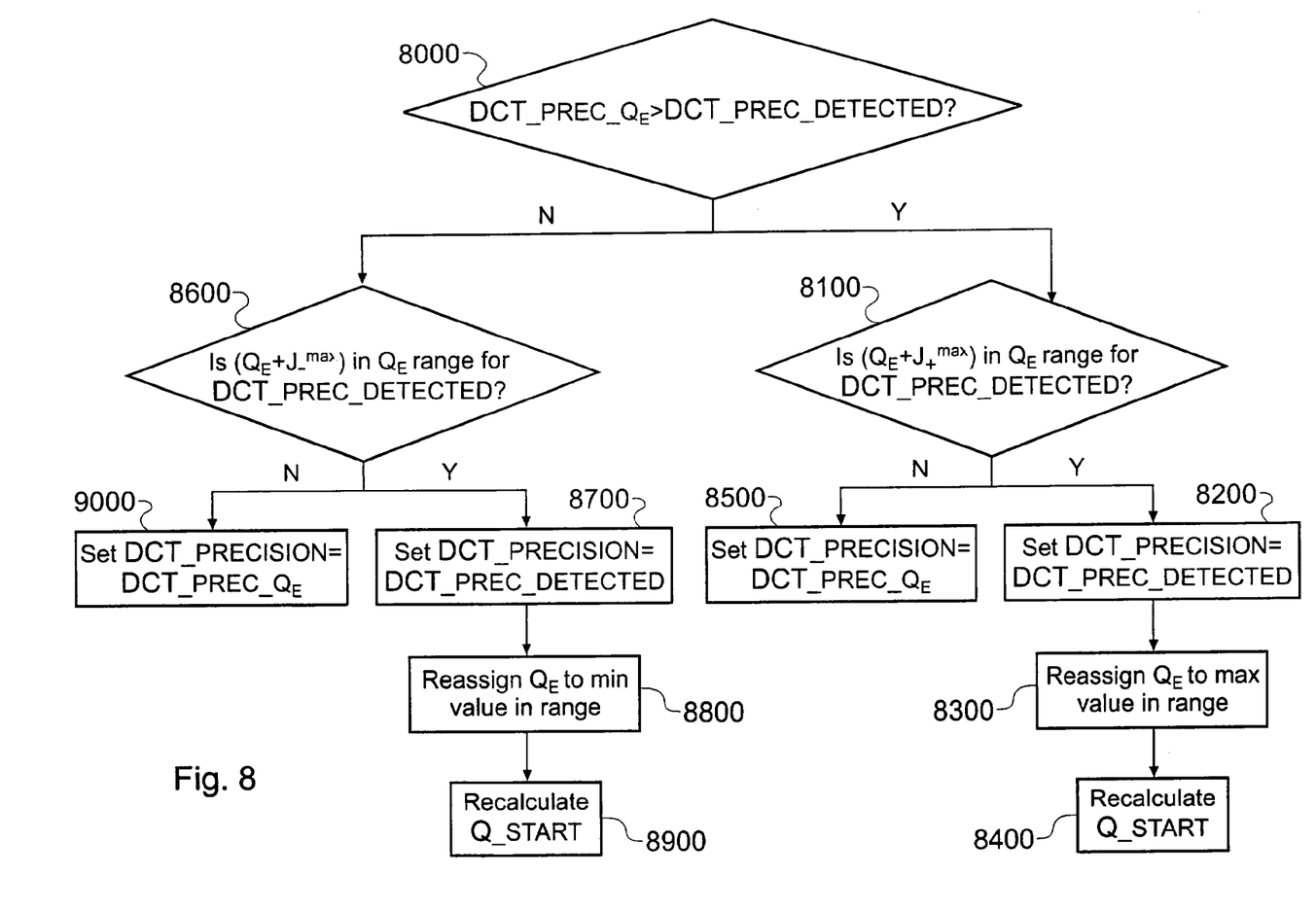
FIG. 8 is a flow chart illustrating how the final values of DCT_PRECISION and Q_START are selected by the parameter estimation circuit of FIG. 5A.

FIG. 8 is a flow chart illustrating how the final values of DCT_PRECISION and Q_START are selected. First consider the effects of positive jitter. If DCT_PREC_Q$_E$>DCT_PREC_DETECTED at step 8000 we proceed to step 8100 and if the value of Q$_E$ minus $J_+^{max}$ lies in the Q$_E$ range corresponding to DCT_PRECISION=DCT_PREC_DETECTED in the third column of Table 1 or Table 2 above, then we proceed to step 8200 where the final value of DCT_PRECISION is set equal to DCT_PREC_DETECTED. Next, at step 8300 the value of Q$_E$ is reassigned such that it corresponds to the maximum possible value within the Q$_E$ range (from Table 1 or 2) associated with DCT_PREC_DETECTED. Effectively the final value of Q$_E$ is shifted such that it falls within the Q$_E$ range corresponding to the final DCT_PRECISION. This shift is in accordance with the predicted error in the value of the initially determined value of Q$_E$. After reassigning Q$_E$ at step 8300 we proceed to step 8400 where the value of Q_START is recalculated in accordance with the fourth column of Table 1 or 2 so that it is appropriate to the reassigned value of Q$_E$.

If on the other hand at step 8100 the value of Q$_E$ minus $J_+^{max}$ lies outwith the Q$_E$ range corresponding to DCT_PRECISION=DCT_PREC_DETECTED in the third column of Table 1 or Table 2 above, we proceed to step 8500 where the final value of DCT_PRECISION is set equal to DCT_PREC_Q$_E$. The value of Q_START is not reassigned in this case.

Next consider the effects of negative jitter. If at step 8000 DCT_PREC_Q$_E$<DCT_PREC_DETECTED we proceed to step 8600 and if the value of Q$_E$ plus $J_-^{max}$ lies in the Q$_E$ range corresponding to DCT_PRECISION=DCT_PREC_DETECTED in the third column of Table 1 or Table 2 above, then we further proceed to step 8700 where the final value of DCT_PRECISION is set equal to DCT_PREC_DETECTED. From step 8700 we proceed to step 8800 where the value of Q$_E$ is reassigned such that it corresponds to the minimum possible value within the Q$_E$ range (from Table 1 or 2) associated with DCT_PREC_DETECTED. Effectively the final value of Q$_E$ is shifted such that it falls within the Q$_E$ range corresponding to the final DCT_PRECISION. This shift is in accordance with the predicted error in the initially determined value of Q$_E$. After reassigning Q$_E$ at step 8800 we proceed to step 8900 where value of Q_START is recalculated from the fourth column of Table 1 or 2, from the reassigned value of Q$_E$.

If on the other hand, at step 8600 the value of Q$_E$ plus $J_-^{max}$ lies outwith the Q$_E$ range corresponding to DCT_PRECISION=DCT_PREC_DETECTED in the third column of Table 1 or Table 2 above, then we proceed to step 9000 where the final value of DCT_PRECISION is set equal to DCT_PREC_Q$_E$. In this case the value of Q_START is not reassigned.

The DCT_PRECISION selection module 160 in FIG. 5A outputs the final values of DCT_PRECISION and Q_START to the bit allocation module 400 of FIG. 2. The detection of DCT_PRECISION for non-source input data increases the likelihood of the encoder 10 selecting the overall quantisation divisor that gives the best possible reproduced image quality.

Figure 5B:
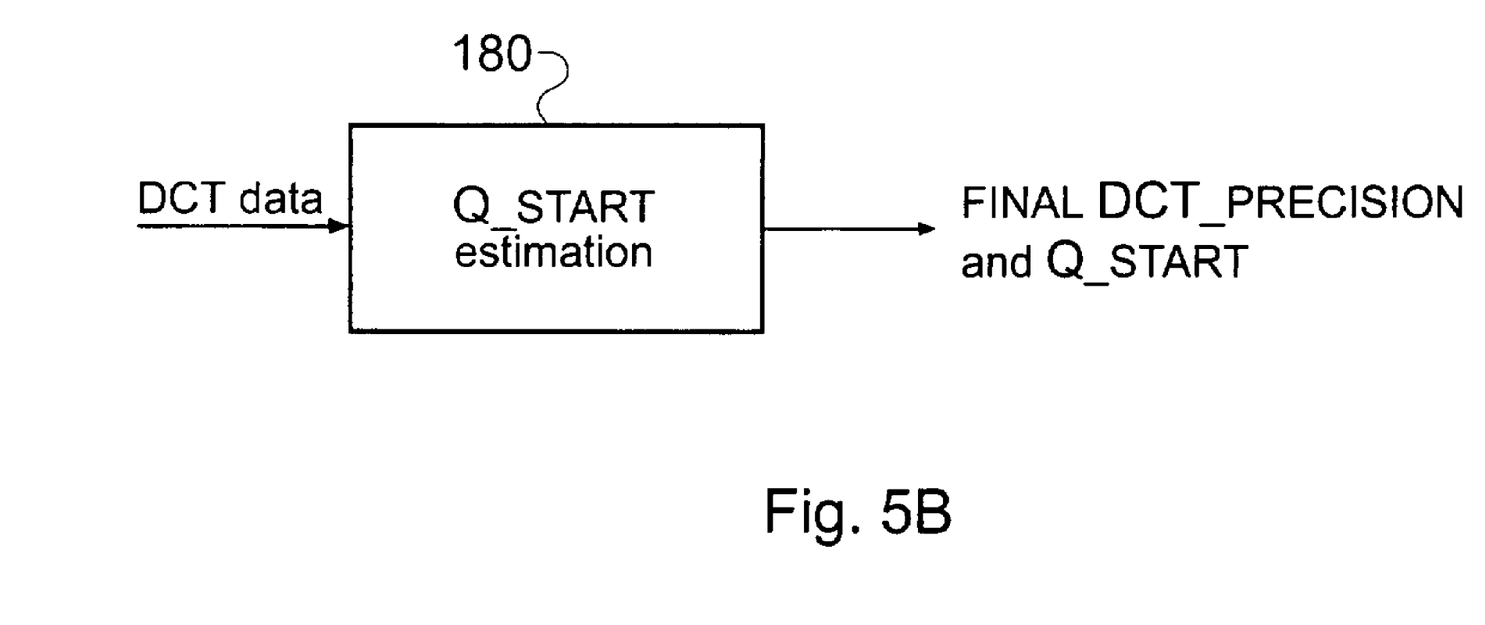
FIG. 5B schematically illustrates a parameter estimation circuit according to a second embodiment of the invention.

FIG. 5B schematically illustrates a parameter estimation circuit according to a second embodiment of the invention. The parameter estimation circuit of FIG. 5B comprises a Q_START estimation module 180 which is identical in structure and function to the corresponding module in the parameter estimation circuit of FIG. 5A described above. In this embodiment of the invention both the value of the parameter Q_START and the final value for DCT_PRECISION are estimated from the numerical value of Q$_E$ in accordance with either Table 1 for activity off mode or Table 2 for activity on mode. Note that since the estimated values of Q_START and DCT_PRECISION produced by the parameter estimation circuit of FIG. 5B do not take account of "jitter" the estimates produced by the parameter estimation circuit of FIG. 5A are likely to be more accurate.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data compression apparatus for performing data compression on input data, said apparatus comprising:
   a quantisation parameter estimation unit configured to detect whether input data is source data or non-source data, said non-source data having undergone a previous compression/decompression cycle, and derive an estimated value of a quantisation parameter used in a previous compression/decompression cycle applied to said input data if non-source data is detected, by detecting rounding effects in data values of at least a subset of said input data, said quantisation parameter estimation unit is configured to detect rounding effects by identifying one or more frequencies of occurrence of respective one or more particular sequences of ones and zeros corresponding to a respective predetermined number of least significant bits of said input data; and a parameter selection unit configured to select a quantisation parameter for use in compression of said input data based on receiving the detection result on whether input data is source data or non-source data from the quantisation parameter estimation unit and, if non-source data is detected, the estimated value of the quantisation parameter used in a previous compression/decompression cycle received from the quantisation parameter estimation unit.

2. Apparatus according to claim 1, in which, if said quantisation parameter estimation unit detects less than a predetermined degree of rounding effects, said input data is detected as source data which has not been subject to a previous compression/decompression cycle.

3. Apparatus according to claim 2, in which when said input data is not detected as source data, said parameter selection unit assigns a current quantisation parameter to said input data which is substantially equal to said estimated previous value.

4. Apparatus according to claim 1, in which said quantisation parameter estimation unit is configured to compare a sum comprising one or more of said frequencies of occurrence with a respective threshold to determine said estimated previous value, wherein said threshold is at least in part determined by a further one of said frequencies of occurrence.

5. Apparatus according to claim 1, wherein said input data represents one or more images.

6. Apparatus according to claim 5, wherein said estimated previous value is calculated for each image.

7. Apparatus according to claim 6, wherein said quantisation parameter estimation unit is configured to detect a further property of said input data to determine said estimated previous value, said further property being a weighted sum of differences between pixel values of at least one component of said input data.

8. Apparatus according to claim 7, wherein said quantisation parameter estimation unit is configured to determine said estimated previous value in dependence upon an activity measure of said image or a portion thereof, the activity measure being used to scale the quantisation of the input data.

9. A data compression method in which data compression is performed on input data, said method comprising the steps of:

detecting whether input data is source data or non-source data, said non-source data having undergone a previous compression/decompression cycle:

deriving an estimated value of a quantisation parameter used in a previous compression/decompression cycle applied to said input data if non-source data is detected, by detecting rounding effects in data values of at least a subset of said input data, said deriving detects rounding effects by identifying one or more frequencies of occurrence of respective one or more particular sequences of ones and zeros corresponding to a respective predetermined number of least significant bits of said input data; and selecting a quantisation parameter for use in compression of said input data based on the detection result on whether input data is source data or non-source data and, if non-source data is detected, the estimated value of the quantisation parameter used in a previous compression/decompression cycle.

10. A computer storage medium encoded with computer executable instructions, which when executed by a computer, cause the computer to perform a method comprising:

detecting whether input data is source data or non-source data, said non-source data having undergone a previous compression/decompression cycle;

deriving an estimated value of a quantisation parameter used in a previous compression/decompression cycle applied to said input data if non-source data is detected, by detecting rounding effects in data values of at least a subset of said input data, said deriving detects rounding effects by identifying one or more frequencies of occurrence of respective one or more particular sequences of ones and zeros corresponding to a respective predetermined number of least significant bits of said input data; and selecting a quantisation parameter for use in compression of said input data based on the detection result on whether input data is source data or non-source data and, if non-source data is detected, the estimated value of the quantisation parameter used in a previous compression/decompression cycle.

* * * * *